United States Patent [19]

Smith

[11] Patent Number: 4,598,395

[45] Date of Patent: Jul. 1, 1986

[54] ERASABLE OPTICAL READ/WRITE DATA STORAGE SYSTEM

[75] Inventor: James L. Smith, Grand Prairie, Tex.

[73] Assignee: LTV Aerospace and Defense Co., Dallas, Tex.

[21] Appl. No.: 499,738

[22] Filed: May 31, 1983

[51] Int. Cl.$^4$ .................... G01D 15/34; G11B 7/00
[52] U.S. Cl. .................... 369/100; 358/342; 346/76 L; 365/106; 365/119; 369/101; 369/121
[58] Field of Search .............. 369/108, 100, 101, 107, 369/121; 358/342, 344; 365/106, 119; 346/76 L, 76 R

[56] References Cited

U.S. PATENT DOCUMENTS

| | | | |
|---|---|---|---|
| 3,723,121 | 3/1973 | Hauser | 350/354 X |
| 3,761,942 | 9/1973 | Lorenz | 346/108 X |
| 3,789,420 | 1/1974 | Claytor et al. | 346/76 L |
| 3,789,421 | 1/1974 | Chivian et al. | 346/76 L |
| 4,360,908 | 11/1982 | Howe | 346/76 L |
| 4,380,015 | 4/1983 | Ito et al. | 346/108 |

*Primary Examiner*—Robert L. Richardson
*Attorney, Agent, or Firm*—James M. Cate; S. S. Sadacca

[57] ABSTRACT

An erasable optical read/write data storage system is disclosed. The data storage system utilizes a temperature sensitive data storage disk which includes an optical tuning film and a film of thermochromic phase change material which will change from a first phase to a second phase at temperatures in excess of an upper temperature and back to the first phase at temperatures below a lower temperature. An environmentally controlled chamber is provided to maintain the data storage disk at a selected bias temperature between the lower and upper temperatures to ensure that no unintentional phase change will occur. A thermally controlled support member is utilized to temporarily lower the temperature of the disk to a point below the lower temperature, thereby initializing the disk. A modulated laser beam is then focused on the disk to temporarily heat particular portions of the disk to a temperature in excess of the upper temperature, causing a phase change. The same laser beam at lower power levels may be utilized to optically discern the phase of a particular portion of the disk by means of the variations in reflectivity between the two phases. In a preferred mode of the present invention, a plurality of storage disks are utilized and transfer means are provided to maintain each disk at the bias temperature during storage and transfer. In still another mode of the invention, individually controllable groups of thermoelectric elements embedded near the surface of an integrated disk and support member may be utilized to selectively heat and cool particular sections of the data storage disk, thereby permitting selective erasure of portions of the data encoded thereon.

30 Claims, 7 Drawing Figures

ERASABLE OPTICAL READ/WRITE DATA STORAGE SYSTEM

BACKGROUND OF THE INVENTION

This invention relates to optical data storage systems in general and in particular to optical data storage systems which can both record and read optically discernible data from a storage disk. Still more particularly, this invention relates to optical data storage systems in which the data can be selectively erased.

Optical data storage systems are well known in the art. The so-called "video disk" or "laser disk" systems are excellent examples of the impact of this technology in the marketplace. The optical systems utilized in these disks operate by focusing a laser on a rapidly rotating disk and reflecting light from the surface of the disk. The position of the laser may be accurately controlled utilizing a complex servo tracking system and the amount and characteristics of the light reflected from selected portions of the disk can be utilized to encode a large amount of digital data. The disks utilized with such systems are quite low in manufacturing cost and typically are constructed by ablating, stamping or burning small pits into the surface of each disk. By utilizing a laser beam to detect the presence or absence of these pits there is no mechanical connection between a stylus and the disk and therefore there is no stylus or disk wear. Additionally, a particular section of the data encoded on a disk may be accessed in a relatively short period of time and, in the case of an encoded television picture, a particular frame may be repeatedly accessed to provide a "freeze-frame" effect without adversely affecting either the disk or the stylus.

One shortcoming associated with optical disk data storage systems known in the art is that the typical system available in the marketplace can only be utilized to read data which has been imprinted on a disk at a manufacturing facility. Recently, newer systems have been proposed which can both read and write data onto a disk. Such systems typically use a laser at a slightly higher power level to ablate, burn or blister the disk surface and thereby provide a variation in the amount of light which can be reflected from the disk. While this system represents an advance in the art, it suffers from a shortfall in that the information recorded on the disk in this manner is permanently recorded and may not be erased.

In an effort to overcome this deficiency of known optical disk systems, several approaches have been proposed. In a first approach, a disk covered with a layer of certain rare earth materials is subjected to a magnetic field and then magnetized at selected points by heating those points to a point above the Curie temperature of the material by means of a laser. The presence or absence of magnetization in particular areas of the disk can then be detected by reflective reading with a polarized light source and by detecting the slight rotation of light caused by the Faraday effect.

A second approach which has been proposed utilizes materials which can be changed from an amorphous to a polycrystalline state by the utilization of a laser. The light from a different wavelength laser reflected from a particular portion of each disk can then be utilized to determine whether that portion of the disk material is in its crystalline or amorphous state.

Both the aforementioned systems suffer from severe deficiencies in actual applications. The magneto-optic approach requires the utilization of polarized light and is limited to the larger geometries typically associated with magnetic materials (thus limiting its density of data storage) and the second approach necessitates the utilization of two different wavelength lasers.

Recently, systems have been proposed for utilizing thermochromic phase change materials to store optically discernible digital data. Although this approach demonstrates certain advantages over the previously enumerated systems, there have been numerous difficulties encountered in attempting to maintain the accurate temperatures required. Examples of this early work may be seen in U.S. Pat. Nos. 3,789,420 and 3,789,421.

Therefore, it should be apparent that there has existed a need for an optical disk data storage system which can both read and write data and which may be selectively erased.

SUMMARY OF THE INVENTION

It is therefore one object of the present invention to provide an improved optical data storage disk system.

It is another object of the present invention to provide an improved optical data storage disk.

It is yet another object of the present invention to provide an improved optical data storage disk which permits erasure of stored data.

It is another object of the present invention to provide an improved optical data storage disk which permits selective erasure of portions of the stored data.

It is yet another object of the present invention to provide an improved optical data storage disk system which permits both reading and recording of digital data utilizing a single laser.

It is still another object of the present invention to provide an improved optical read/write data storage disk which may be inexpensively manufactured.

The foregoing objects are achieved as is now described. The data storage system utilizes a temperature sensitive data storage disk which includes an optical tuning film and a film of thermochromic phase change material which will change from a first phase to a second phase at temperatures in excess of an upper temperature and back to the first phase at temperatures below a lower temperature. An environmentally controlled chamber is provided to maintain the data storage disk at a selected bias temperature between the lower and upper temperatures to ensure that no unintentional phase change will occur. A thermally controlled support member is utilized to temporarily lower the temperature of the disk to a point below the lower temperature, thereby initializing the disk. A modulated laser beam is then focused on the disk to temporarily heat particular portions of the disk to a temperature in excess of the upper temperature, causing a phase change. The same laser beam at lower power levels may be utilized to optically discern the phase of a particular portion of the disk by means of the variations in reflectivity between the two phases. In a preferred mode of the present invention, a plurality of storage disks are utilized and transfer means are provided to maintain each disk at the bias temperature during storage and transfer. In still another mode of the invention, individually controllable groups of thermoelectric elements embedded near the surface of an integrated disk and support member may be utilized to selectively heat and cool particular sections of the data storage disk, thereby permitting selective erasure of portions of the data encoded thereon.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
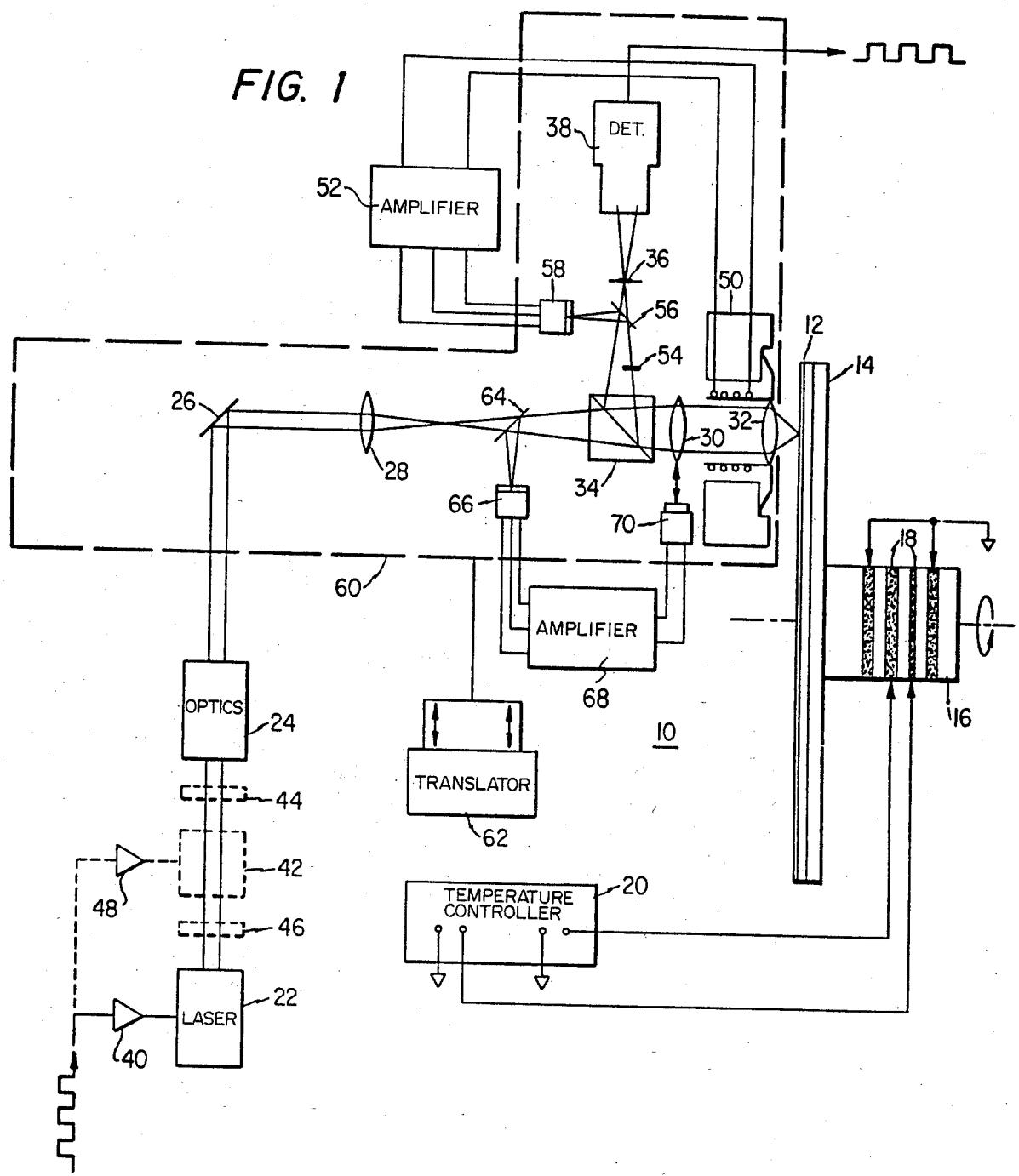
FIG. 1 is a partially diagrammatic and partially schematic view of the major components of the erasable optical read/write data storage system of the present invention.

Referring now to FIG. 1, there is depicted a partially diagrammatic and partially schematic view of erasable optical read/write data storage system of the present invention. System 10 includes a temperature sensitive storage disk 12 which is supported by thermally controlled turntable 14. In an alternate embodiment of the present invention, storage disk 12 is manufactured as an integral portion of turntable 14 to permit a more complex form of interconnection as will be disclosed herein. In the present embodiment, turntable 14 includes a central shank 16 which is utilized to rotate turntable 14 at a selected rate of speed and which includes a plurality of electrical contacts 18 disposed around the outer surface thereof. Electrical contacts 18 are utilized to maintain an electrical connection between a plurality of thermoelectrical elements (not shown) disposed within the upper surface of turntable 14 and temperature controller 20 by means of conventional slip ring connections. Temperature controller 20 may then be utilized to sense and control the temperature of turntable 14 in a manner well known in the art of thermoelectric circuitry.

The temperature of turntable 14 is an important factor in the present invention in that storage disk 12, as will be described herein, is adapted to store optically discernible digital data only while disk 12 is maintained within a preselected temperature range. The "reading" of this optically discernible digital data is accomplished utilizing a laser 22 which is operated in a low power continuous wave manner and focused or collimated utilizing collimation optics 24. The beam of laser 22 is then reflected at right angles by mirror 26 and sharply focused utilizing lens 28, in a manner well known in the optical art. Condenser lens 30 and objective lens 32 are then utilized to focus the output of laser 22 on a selected portion of storage disk 12. As is well known in this art, the light reflected back from storage disk 12 can then be directed by means of a cube beam splitter 34 through pinhole 36 to optical detector 38. The output of optical detector 38 then represents a digital data stream which will vary according to the optical characteristics of selected portions of the surface of storage disk 12.

As will be explained in greater detail below, the "writing" of data onto storage disk 12 is accomplished by selectively and temporarily raising the temperature of a portion of storage disk 12 above a preselected temperature. This is accomplished by utilizing laser 22 at a higher power level to temporarily heat small portions of the surface of storage disk 12. The output of laser 22 can be modulated directly by utilizing the output of amplifier 40 to vary the magnitude of the injection currents, when utilizing a solid state diode laser, or by modulating with amplifier 48 the voltage applied to a Pockels cell 42 when a continuous wave laser (e.g. HeNe laser) is utilized. As is common practice in this area, crossed polarizers 44 and 46 are utilized in conjunction with Pockels cell 42 to produce a modulated beam output. This higher power modulated output of laser 22 may then be focused onto storage disk 12 to selectively heat portions of the disk's surface a small as one micron in diameter.

The proper focus of objective lens 32 is maintained by affixing objective lens 32 to a movable diaphragm of focus head 50 and by varying the current applied to a coil within focus head 50. The magnitude and polarity of the current supplied to focus head 50 are both determined by the output of differential amplifier 52 in the following manner. A portion of the reflected beam output of cube beam splitter 34 is obscured by beam obstructor 54 and the thus obscured beam is then applied to beam splitter 56, which reflects the focused beam between the two elements of bi-element optical detector 58. Any movement of objective lens 32 away from proper focus will then cause the focused beam reflected by beam splitter 56 to blur onto one of the two elements of bi-element optical detector 58, generating an input to differential amplifier 52.

Tracking along the digital data recorded on storage disk 12 is accomplished utilizing both a coarse and vernier position translator. The entire write/read optical head assembly, as included within dashed line 60, is movable by means of radial position translator 62. For vernier translation a portion of the beam is deflected utilizing beam splitter 64 and is focused onto a second bi-element optical detector 66. As above, the output of bi-element optical detector 66 is utilized to drive differential amplifier 68 and the output of differential amplifier 68 is utilized to provide a selected magnitude and polarity of current to lens translator 70. Lens translator 70 is then utilized to move translatable condenser lens 30 which causes proper tracking of the optically discernible data. In a preferred mode of the present invention, lens translator 70 is constructed utilizing a piezoelectric translator.

Figure 2:
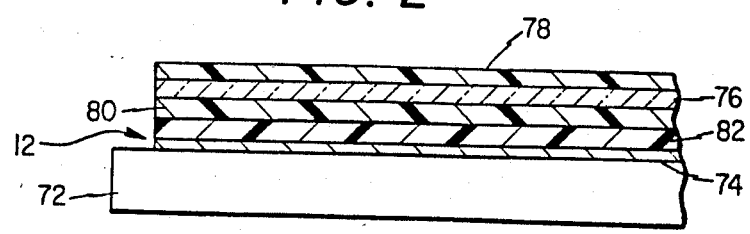
FIG. 2 is a sectional view of one embodiment of the erasable optical read/write data storage disk of the present invention.

Referring now to FIG. 2, there is depicted a sectional view of one embodiment of novel erasable optical read/write data storage disk 12 of the present invention. In the depicted embodiment of the present invention, storage disk 12 includes a circular substrate member 72 having a central aperture therein. Substrate member 72 may be constructed of any suitable dielectric material such as ceramic, glass or plastic, or of metal. In those applications in which substrate member 72 is constructed of a non-metallic material, a layer of reflecting metal film 74 is applied to substrate member 72 to provide a necessary reflective surface for the output of laser 22 (see FIG. 1). Another important feature of the present invention is layer 76 which comprises a layer of temperature sensitive phase change material approximately 0.05 to 0.15 microns in thickness which is disposed over metal film 74. In a preferred embodiment of the present invention, the temperature sensitive phase change material utilized is a thermochromic material such as $VO_2$ or $Cu_2HgI_4$. The properties of such thermochromic materials are well documented and while the following specific details refer to the properties of $VO_2$, it is anticipated that other equally applicable materials may be utilized.

$VO_2$ exhibits a definite semiconductor to metal phase transition near 65° C. which is well documented in literature. This transition is accompanied by changes in the optical properties of the material which are highly visible under appropriate wavelength lighting. This effect, coupled with the fact that the effect occurs at a different temperature for the metal to semiconductor phase transition, make this material highly interesting for the storage of optically discernible digital data. Thus, while the semiconductor to metal phase transition occurs at approximately 65° C., the metal to semiconductor phase transition does not occur until the material has been cooled to approximately 55° C. By utilizing this hysteresis effect and by properly biasing the temperature of storage disk 12 it is possible to assure that no unintentional phase changes will occur. It should therefore be apparent that a body of this material may be cooled to a temperature below 55° C. to ensure that the entire body of material is in the semiconductor phase and then heated to a bias temperature of approximately 60° C. Temporary and selective heating of particular portions of the material with a laser beam may then be utilized to effect a phase transition to the metallic phase at selected locations on the surface of storage disk 12. Thereafter, so long as the material is kept at a selected bias temperature between the transition temperatures, the digital data thus stored can be maintained for an indefinite period of time.

In a preferred embodiment of the present invention certain additional films or layers may be utilized to enhance the operation of storage disk 12. An optical tuner/protector layer 78 may be utilized to protect the surface of layer 76. Additionally, a dielectric optical tuning layer 80 may be selected which will maximize the contrasts in reflectivity of the two phases of whatever phase change material is utilized. Experimentation has shown that a suitable tuning layer may be constructed utilizing a film of relatively transparent material such as MgO or $MgF_2$. A buffer/tuner layer 82 may also be interposed between tuning layer 80 and metal film 74 if tuning layer 80 and metal film 74 are determined to be chemically reactive.

Figure 3:
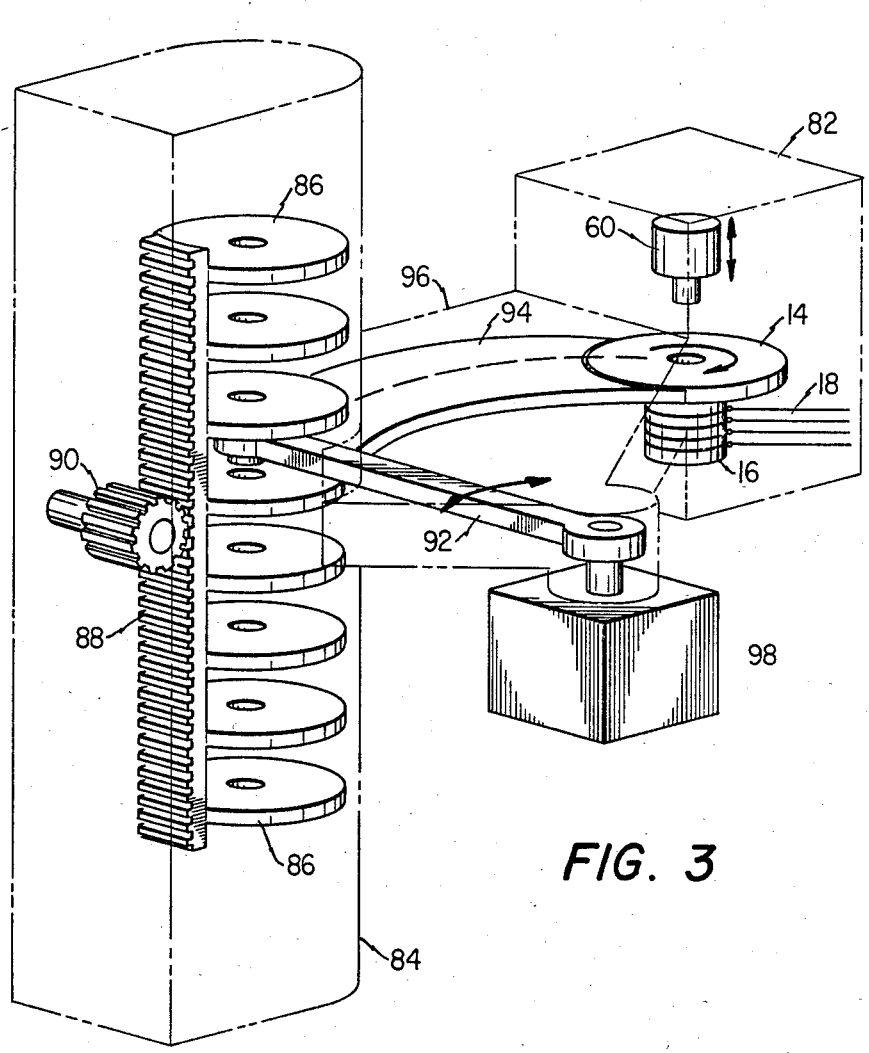
FIG. 3 is a partially diagrammatic and partially schematic view of the transfer mechanism and environmentally controlled sections of the erasable optical read/write storage system of the present invention.

With reference now to FIG. 3, there is depicted a partially diagrammatic and partially schematic view of the transfer mechanism and environmentally controlled sections of erasable optical read/write data storage system 10 of the present invention. As can be seen, turntable 14 and write/read optical head assembly 60 are completely enclosed within an environmentally controlled chamber 82 which may be utilized to help maintain a storage disk supported by turntable 14 at a selected bias temperature. A second environmentally controlled chamber 84 is also provided and utilized to store a plurality of temperature sensitive storage disks at the selected bias temperature. Chamber 84 also includes a plurality of temperature controlled receptacles 86 which are each designed to receive and support a single storage disk while maintaining such storage disks at the desired temperature.

Transfer of a selected disk from chamber 84 to turntable 14 within chamber 82 is accomplished by raising or lowering receptacles 86 utilizing rack 88 and pinion 90. Transfer arm 92 is then pivoted into chamber 84 and lowered into the central aperture of a particular disk. Transfer arm 92 may then be pivoted into chamber 82 while sliding a portable storage disk along transfer track 94. Transfer track 94 is thermally controlled and is provided to ensure that a selected disk is maintained at the proper bias temperature during transfer to turntable 14. In a preferred embodiment of the present invention, transfer track 94 and transfer arm 92 are both enclosed in a third environmentally controlled chamber 96 which communicates between chamber 84 and chamber 82. Those skilled in the art will appreciate that transfer mechanism 98 can then be utilized to selectively transfer a desired storage disk from chamber 84 to the surface of turntable 14. Further, it should be apparent upon reference to this specification that the shape and design of environmentally controlled chamber 84 may be altered to accommodate a greater or lesser number of storage disks as desired (e.g. a toroid or cylindrical shape).

Figure 4:
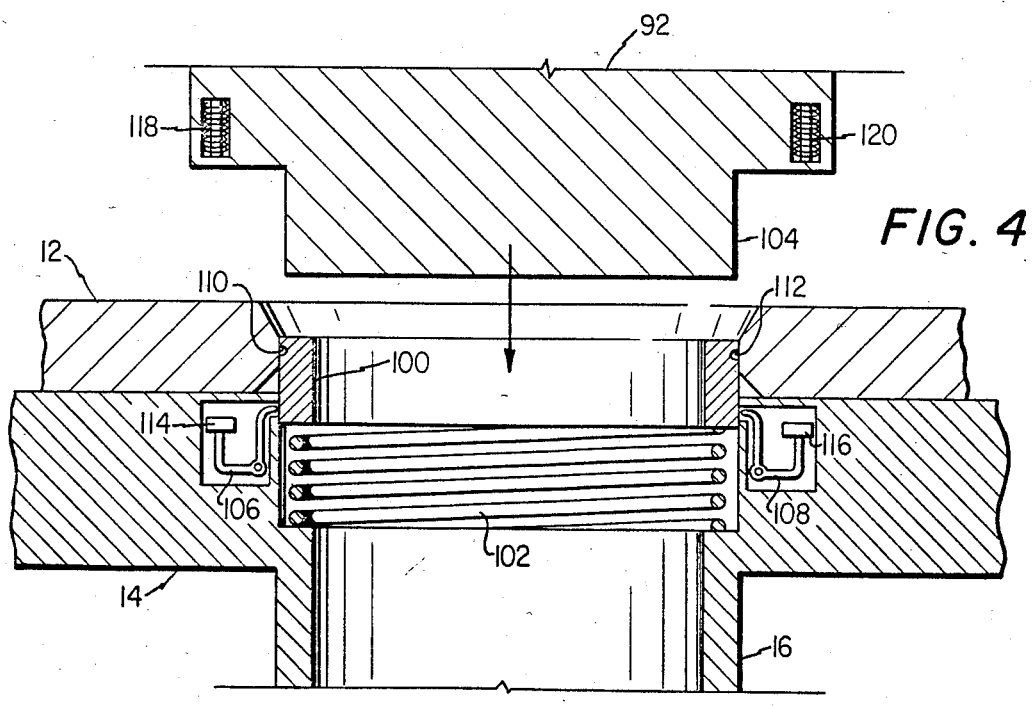
FIG. 4 is a detailed sectional view of the release mechanism utilized in a preferred embodiment of the transfer mechanism of the erasable optical read/write data storage system of the present invention.

Referring now to FIG. 4, there is depicted a detailed sectional view of a release mechanism which may be utilized with the preferred embodiment of transfer mechanism 98 of the present invention. As can be seen, a storage disk 12 is supported on turntable 14 and held in a central location by means of centering sleeve 100. Centering sleeve 100 is utilized so that disk 12 will remain stationary during rotation of turntable 14. Centering sleeve 100 is spring biased into the depicted raised position by means of spring 102 and may be depressed into turntable 14 to a position flush with the upper surface of turntable 14 by the lowering of actuator 104 of transfer arm 92.

In order to permit a disk to be slid onto or off of the surface of turntable 14, centering sleeve 100 must be depressed into turntable 14. Latches 106 and 108 may be pivoted into engagement with apertures 110 and 112 to restrain sleeve 100 in this lowered position. Latches 106 and 108 are each pivoted about a mounting point and each includes a permanent magnet 114 and 116. Electromagnets 118 and 120 within transfer arm 92 may be selectively energized to pivot latches 106 and 108 into the locked position by means of magnetic attraction between an electromagnet and its associated permanent magnet. After a new disk has been transferred onto turntable 14, it is a simple matter to reverse the polarity of the current to electromagnets 118 and 120 to magnetically repel magnets 114 and 116, causing latches 106 and 108 to release and permitting centering sleeve 100 to be urged upward by the action of spring 102.

Figure 5:
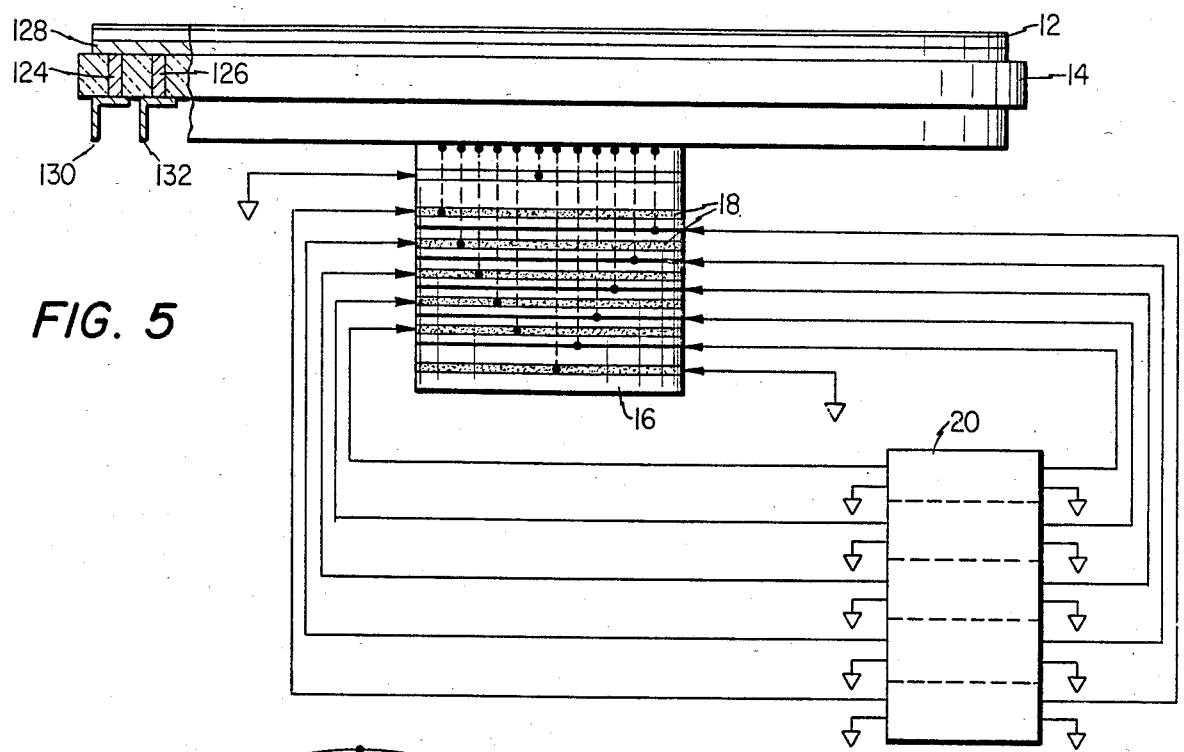
FIG. 5 is a partially diagrammatic and partially schematic view of an alternate embodiment of the turntable support mechanism of the erasable optical read/write data storage system of the present invention.

Referring now to FIG. 5, there is pictured a partially diagrammatic and partially schematic view of an alternate embodiment of a combined turntable support mechanism and storage disk for use with the erasable optical read/write data storage system of the present invention.

In the depicted alternate embodiment of FIG. 5, similar subsystems and sections of the system are labeled utilizing the same reference numerals utilized in the previously described embodiment. In this embodiment, storage disk 12 and turntable 14 are formed in a single integrated unit to permit a more precise and complex interconnection between the thermoelectric elements disposed within turntable 14 and temperature controller 20. As in the previous embodiment of the present invention, the upper surface of turntable 14 includes a plurality of thermoelectric elements which can be utilized to heat (bias) or cool (erase) a storage disk supported by turntable 14 or formed in the upper surface of turntable 14. However, in the embodiment of FIG. 5, precise control of individual groups of thermoelectric elements can be utilized to permit precise erasure of selected portions of the data stored on storage disk 12.

In the manner of most thermoelectric elements, each selected portion of the surface of turntable 14 includes a pair of opposite type elements 125 and 126 (e.g. p and n type bismuth telluride) connected at the top by a metal tab 128. Current may be applied to thermoelectric elements 124 and 126 utilizing metal rings 130 and 132 and the direction and magnitude of current through one type of thermoelectric element, to metal ring 128 and through the second type of thermoelectric element will cause heat conduction to or from metal ring 128, heating or cooling disk 12. As can be seen, the additional complexity of this approach is reflected in the greater number of electrical connections 18 which must be included on shank 16.

Figure 6:
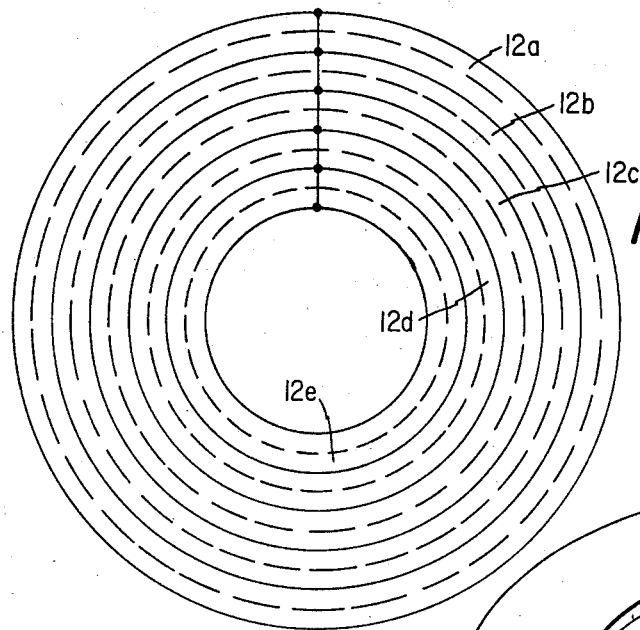
FIG. 6 is a plan view of the upper surface of the turntable support mechanism of FIG. 5.

As can be seen in FIG. 6, it is a simple matter to divide the surface of disk 12 into a plurality of concentric circular regions 12a, 12b, 12c, 12d and 12e which can be simply and easily heated to bias temperature or cooled to erasing temperature by the selective application of current to the thermoelectric elements disposed beneath each ring. Further, if additional complexity of electrical interconnection is not a burden, each circular region can be easily subdivided further into appropriate sectors. Thermocouples or thermistors can also be imbedded in the surface of disk 12 to permit the temperature of the surface of disk 12 to be accurately monitored by temperature controller 20.

Figure 7:
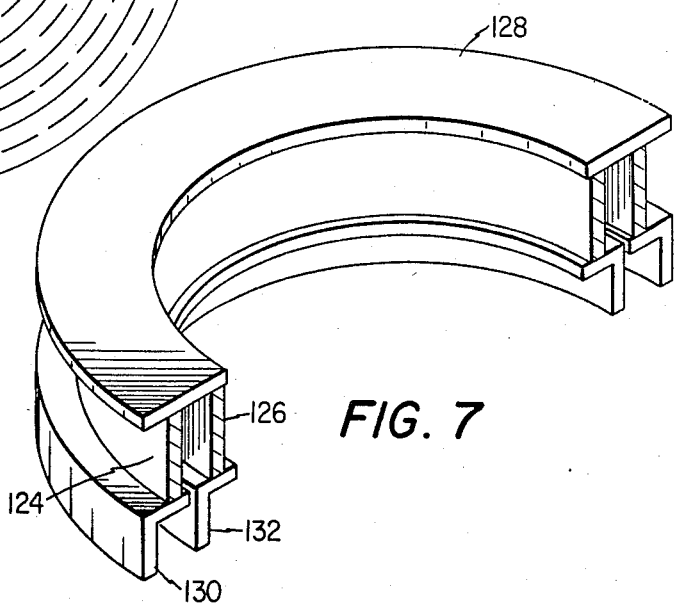
FIG. 7 is a perspective view of a section of a thermoelectric element which may be utilized in the embodiment of the turntable support mechanism depicted in FIG. 5.

Finally, referring to FIG. 7, there is depicted a perspective view of a typical thermoelectric element which may be utilized in both embodiments of the present invention. As is depicted, two thermoelectric elements 124 and 126 of opposite types are provided. An upper metal ring 128 is utilized to couple element 124 to element 126 and current is applied through lower rings 130 and 132. In various alternate embodiments of this aspect of the present invention, the metal rings 130 and 132 may be short tabs which are connected along circular paths or simply continuous one-piece rings. The concentric, circular elements 124 and 126 may be continuous materials or circular chains of connected element segments. Alternate lower rings are connected to a common ground and the remaining rings are subject to the individual application of heating or cooling current so disk 12 may be divided into erasable sectors as desired.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. An erasable optical read/write data storage system comprising:
    a body of temperature sensitive phase change material comprising a planar element coated with a film of thermochromic material adapted to change from a first phase to a second phase at temperatures in excess of a selected upper temperature and from said second phase to said first phase at temperatures less than a selected lower temperature;
    a film of optical tuning material disposed on said body;
    a temperature controlled support member for maintaining said body of phase change material at a substantially constant temperature above said selected lower temperature and below said selected upper temperature;
    means for selectively and temporarily lowering the temperature of said body of phase change material to a temperature below said selected lower temperature wherein said body of phase change material will change to said first phase;
    means for temporarily heating selected portions of said body of phase change material to a temperature in excess of said selected upper temperature wherein said selected portions of said body of phase change material will change to said second phase; and
    means for optically distinguishing said selected portions of said body of phase change material in said second phase from the remainder of said body of phase change material in said first phase.

2. The erasable optical read/write data storage system according to claim 1 further including means for rotating said planar element at a selected speed.

3. The erasable optical read/write data storage system according to claim 1 wherein said thermochromic material is selected from the group comprising $VO_2$ and $Cu_2HgI_4$.

4. The erasable optical read/write data storage system according to claim 1 wherein said film of optical tuning material is selected from the group comprising $MgO$ and $MgF_2$.

5. The erasable optical read/write data storage system according to claim 1 further including an environmentally controlled chamber adapted to enclose said body of phase change material and said temperature controlled support member.

6. The erasable optical read/write data storage system according to claim 1 wherein said means for selectively and temporarily lowering the temperature of said body of phase change material comprises a temperature control circuit adapted to vary the temperature of said temperature controlled support member.

7. The erasable optical read/write data storage system according to claim 6 wherein said temperature controlled support member comprises means for controlling a plurality of thermoelectric elements disposed in the surface of said temperature controlled support member.

8. The erasable optical read/write data storage system according to claim 1 wherein said means for temporarily heating selected portions of said body of phase change material comprises a modulated laser beam.

9. The erasable optical read/write data storage system according to claim 8 wherein said means for optically distinguishing said selected portions of said body of phase change material in said second phase from the remainder of said body of phase change material in said first phase comprises a laser beam and means for measuring the amount of light from said laser beam which is reflected from said body of phase change material.

10. An erasable optical read/write data storage system comprising:
- a body of temperature sensitive phase change material comprising a planar element coated with a film of thermochromic material adapted to change from a first phase to a second phase at temperatures in excess of a selected upper temperature and from said second phase to said first phase at temperatures less than a selected lower temperature;
- a film of optical tuning material disposed on said body;
- means for maintaining said body of phase change material at a substantially constant temperature above said selected lower temperature and below said selected upper temperature;
- means for selectively and temporarily lowering the temperature of said body of phase change material to a temperature below said selected lower temperature wherein said body of phase change material will change to said first phase; and
- a single laser means operable at a first power level for temporarily heating selected portions of said body of phase change material to a temperature in excess of said selected upper temperature wherein said selected portions of said body of phase change material will change to said second phase and operable at a second lower power level for optically distinguishing said selected portions of said body of phase change material from the remainder of said body of phase change material.

11. The erasable optical read/write data storage system according to claim 10 further including means for rotating said planar element at a selected speed.

12. The erasable optical read/write data storage system according to claim 10 wherein said thermochromic material is selected from the group comprising $VO_2$ and $Cu_2HgI_4$.

13. The erasable optical read/write data storage system according to claim 10 wherein said film of optical tuning material is selected from the group comprising $MgO$ and $MgF_2$.

14. The erasable optical read/write data storage system according to claim 10 wherein said means for maintaining said body of phase change material at a substantially constant temperature comprises a temperature controlled support member disposed beneath said body of phase change material.

15. The erasable optical read/write data storage system according to claim 14 further including an environmentally controlled chamber adapted to enclose said body of phase change material and said temperature controlled support member.

16. The erasable optical read/write data storage system according to claim 14 wherein said means for selectively and temporarily lowering the temperature of said body of phase change material comprises a temperature control circuit adapted to vary the temperature of said temperature controlled support member.

17. The erasable optical read/write data storage system according to claim 16 wherein said temperature control circuit comprises means for controlling a plurality of thermoelectric elements disposed in the surface of said temperature controlled support member.

18. The erasable optical read/write data storage system according to claim 10 wherein said single laser means includes modulating means for modulating the output of said single laser means at said first power level.

19. The erasable optical read/write data storage system according to claim 10 wherein said single laser means includes means for detecting light reflected from said body of phase change material.

20. An optical read/write data storage system comprising:
- a plurality of temperature sensitive storage disks, adapted to store optically discernible digital data;
- a first environmentally controlled chamber adapted to store said plurality of storage disks;
- a turntable adapted to support a selected one of said plurality of storage disks and adapted to rotate at a selected speed;
- said turntable including controllable thermoelectric elements disposed in the upper surface thereof and adapted to selectively raise and lower the temperature of selected portions of a selected one of said plurality of storage disks supported thereon;
- a single laser means disposed adjacent to said turntable and adapted to write and read optically discernible digital data onto or from said selected one of said plurality of storage disks;
- a second environmentally controlled chamber adapted to enclose said single laser means and said turntable;
- a temperature controlled transfer track disposed between said first environmentally controlled chamber and said turntable and means for selectively sliding a selected one of said plurality of storage disks along said transfer track for transferring a selected one of said plurality of storage disks from said first environmentally controlled chamber to said second environmentally controlled chamber and adapted to maintain said selected one of said plurality of storage disks at a selected temperature during said transfer; and
- a third environmentally controlled chamber communicating between said first environmentally controlled chamber and said second environmentally controlled chamber and adapted to enclose said transfer track.

21. An optical read/write data storage system according to claim 20 wherein said first chamber includes a plurality of temperature controlled receptacles each adapted to receive one of said plurality of temperature sensitive storage disks and to maintain said storage disks at said selected temperature.

22. An optical read/write data storage system according to claim 20 wherein said single laser means is operable at a first power level for temporarily heating selected portions of a storage disk supported on said turntable and operable at a second lower power level for distinguishing optically discernible digital data from a storage disk supported on said turntable.

23. An optical read/write data storage system according to claim 20 wherein each of said plurality of storage disks includes a central aperture therein and wherein said turntable includes a movable centering sleeve mounted therein and adapted to be inserted into said central aperture while said mounting sleeve is disposed in a raised position.

24. An optical read/write data storage system according to claim 23 wherein said means for selectively sliding includes means for selectively raising and lowering said centering sleeve.

25. An optical read/write data storage system according to claim 24 wherein said turntable includes a magnetic latch for restraining said centering sleeve and wherein said transfer means includes electromagnetic means for operating said magnetic latch.

26. An erasable optical read/write data storage system comprising:
   temperature sensitive storage disk adapted to store optically discernible digital data while said disk is maintained at a selected temperature;
   a turntable adapted to support said storage disk and rotate said disk at a selected speed;
   a single laser means disposed adjacent to said turntable and adapted to write and read optically discernible digital data onto or from said storage disk;
   an environmentally controlled chamber adapted to enclose said turntable and said single laser means and to maintain said selected temperature; and
   a plurality of individually controllable thermoelectric elements disposed in the surface of said turntable and adapted to selectively heat and cool particular portions of said temperature sensitive storage disk wherein said optically discernible digital data may be erased in said particular portions of said storage disk without effecting digital data stored on other portions of said storage disk.

27. An erasable optical read/write data storage system according to claim 26 wherein said plurality of individually controllable thermoelectric elements comprises theremoelectric elements disposed in a plurality of concentric rings in the surface of said turntable.

28. An erasable optical read/write data storage system according to claim 26 wherein said single laser means is operable at a first power level for temporarily heating selected portions of said temperature sensitive storage disk and operable at a second lower power level for reading optically discernible digital data from said temperature sensitive storage disk.

29. An erasable optical read/write data storage system comprising:
   a body of temperature sensitive phase change material adapted to change from a first phase to a second phase at temperatures in excess of a selected upper temperature and from said second phase to said first phase at temperatures less than a selected lower temperature;
   a temperature controlled support member for maintaining said body of phase change material at a substantially constant temperature above said selected lower temperature and below said selected upper temperature;
   a plurality of individually controllable thermoelectric elements disposed in said temperature controlled support member for selectively and temporarily lowering the temperature of particular portions of said body of phase change material to a temperature below said selected lower temperature wherein said particular portions of said body of phase change material will change to said first phase and for selectively and temporarily heating particular portions of said body of phase change material to a temperature in excess of said selected upper temperature wherein said particular portions of said body of phase change material will change to said second phase without effecting nonselected portions of said body of phase change material; and
   means for optically distinguishing said selected portions of said body of phase change material in said second phase from the remainder of said body of phase change material in said first phase.

30. The erasable optical read/write data storage system of claim 29 and further including:
   an environmentally controlled chamber adapted to enclose said body of phase change material, said temperature controlled support member and said optically distinguishing means.

* * * * *